United States Patent
Shibata

(10) Patent No.: US 10,140,869 B2
(45) Date of Patent: Nov. 27, 2018

(54) RADIO APPARATUS, PROCESSING APPARATUS AND PROCESSING SYSTEM

(71) Applicant: Panasonic Intellectual Property Management Co., Ltd., Osaka (JP)

(72) Inventor: Teppei Shibata, Gifu (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 25 days.

(21) Appl. No.: 14/662,166

(22) Filed: Mar. 18, 2015

(65) Prior Publication Data

US 2015/0279214 A1    Oct. 1, 2015

(30) Foreign Application Priority Data

Mar. 28, 2014 (JP) ................ 2014-069777
Oct. 31, 2014 (JP) ................ 2014-223322

(51) Int. Cl.
*G08G 1/16* (2006.01)
*B60Q 9/00* (2006.01)

(52) U.S. Cl.
CPC .......... *G08G 1/166* (2013.01); *B60Q 9/008* (2013.01)

(58) Field of Classification Search
CPC .. G08G 1/166; G08G 1/096791; G08G 1/161; G08G 1/052; G08G 1/056; B60Q 9/008
See application file for complete search history.

(56) References Cited

U.S. PATENT DOCUMENTS

| | | | | |
|---|---|---|---|---|
| RE36,122 E | * | 3/1999 | Mattes | B60R 21/0132 180/268 |
| 6,104,973 A | * | 8/2000 | Sugiyama | B60R 21/0132 701/46 |
| 9,111,453 B1 | * | 8/2015 | Alselimi | G06K 9/00785 |
| 2004/0117107 A1 | * | 6/2004 | Lee | G08G 1/0104 701/117 |
| 2005/0021192 A1 | * | 1/2005 | Takafuji | B60R 21/0136 701/1 |
| 2007/0282532 A1 | * | 12/2007 | Yamamoto | B60R 21/0134 701/301 |
| 2009/0143987 A1 | * | 6/2009 | Bect | B60R 21/0134 701/301 |

(Continued)

FOREIGN PATENT DOCUMENTS

| | | |
|---|---|---|
| JP | 2000-348299 | 12/2000 |
| JP | 2005-128830 | 5/2005 |

(Continued)

*Primary Examiner* — An T Nguyen
(74) *Attorney, Agent, or Firm* — McDermott Will & Emery LLP

(57) ABSTRACT

A first determination unit provisionally determines collision or non-collision between a vehicle and another vehicle on the basis of positional information of the vehicle and positional information of the other vehicle. A second determination unit changes a determination result to collision when the provisional determination result has been collision N times in succession and when the determination result was previously non-collision, and changes the determination result to non-collision when the provisional determination result has been non-collision M times in succession and when the determination result was previously collision. Here, N is smaller than M. N and M are positive integral numbers.

9 Claims, 12 Drawing Sheets

(56) References Cited

U.S. PATENT DOCUMENTS

| | | | |
|---|---|---|---|
| 2010/0131153 A1 | 5/2010 | Suzuki | |
| 2010/0305857 A1* | 12/2010 | Byrne | G06T 7/73 701/301 |
| 2011/0205102 A1 | 8/2011 | Shibata et al. | |
| 2012/0016627 A1* | 1/2012 | Nagura | G08G 1/161 702/150 |
| 2013/0293395 A1* | 11/2013 | Ohama | G08G 1/16 340/904 |
| 2014/0009275 A1* | 1/2014 | Bowers | B60Q 1/00 340/436 |
| 2014/0009307 A1* | 1/2014 | Bowers | G08G 1/161 340/901 |
| 2014/0012492 A1* | 1/2014 | Bowers | G08G 1/166 701/301 |
| 2014/0025285 A1* | 1/2014 | Trombley | G01S 5/0072 701/301 |
| 2014/0136044 A1* | 5/2014 | Conrad | G08G 1/166 701/23 |
| 2015/0035662 A1* | 2/2015 | Bowers | B60Q 9/008 340/436 |
| 2015/0035687 A1* | 2/2015 | Bowers | G08G 1/166 340/933 |
| 2015/0142208 A1* | 5/2015 | Ito | B60W 30/09 701/1 |
| 2015/0232073 A1* | 8/2015 | Fujishiro | B60T 7/22 701/70 |
| 2015/0264538 A1* | 9/2015 | Klang | H04W 4/023 455/457 |
| 2015/0279214 A1* | 10/2015 | Shibata | G08G 1/166 340/435 |
| 2017/0236423 A1* | 8/2017 | Bowers | G08G 1/166 340/903 |

FOREIGN PATENT DOCUMENTS

| | | |
|---|---|---|
| JP | 2007-323185 | 12/2007 |
| JP | 2008-282279 | 11/2008 |
| JP | 2009-133780 | 6/2009 |
| JP | 2010-256943 | 11/2010 |
| JP | 2011-174720 | 9/2011 |
| JP | 2014-223322 | 12/2014 |

* cited by examiner

FIG. 5

| ID | UPDATE FLAG | IMMEDIATE DETERMINATION RESULT | NUMBER OF COLLISION PROVISIONAL DETERMINATIONS IN SUCCESSION | NUMBER OF NON-COLLISION PROVISIONAL DETERMINATIONS IN SUCCESSION | STABILIZED DETERMINATION RESULT |
|---|---|---|---|---|---|
| 1 | FINISHED | COLLISION | 2 | 0 | COLLISION |
| 2 | FINISHED | NON-COLLISION | 0 | 3 | COLLISION |
| 4 | UNFINISHED | NON-COLLISION | 0 | 2 | COLLISION |
| 5 | FINISHED | COLLISION | 1 | 0 | NON-COLLISION |

RADIO APPARATUS, PROCESSING APPARATUS AND PROCESSING SYSTEM

BACKGROUND

1. Technical Field

The present disclosure relates to a communication technique, and particularly to a radio apparatus that receives a signal including predetermined information, a process apparatus, and a process system.

2. Description of the Related Art

Inter-vehicle radio communication apparatuses communicate with one another between vehicles on the move to communicate information on the vehicles such as driving conditions. The inter-vehicle radio communication apparatus receives incoming information signals and detects another vehicle which is predicted to be in the vicinity of a position where the vehicle is substantially heading at the same time as the other vehicle on the basis of the information signal, and notifies the presence of the detected other vehicle (see, for example, Japanese Unexamined Patent Application Publication No. 2000-348299).

Further improvements of the invention of Japanese Unexamined Patent Application Publication No. 2000-348299 are needed.

SUMMARY

In one general aspect, the techniques disclosed here feature a radio apparatus that can be mounted in a vehicle. The radio apparatus includes an acquirer that acquires first positional information of a vehicle in which the radio apparatus is mounted; a receiver that receives, from another radio apparatus, a packet signal that includes at least second positional information of another vehicle in which the other radio apparatus is mounted; a first determiner that provisionally determines collision or non-collision between the vehicle and the other vehicle on the basis of the first positional information that is acquired by the acquirer and the second positional information included in the packet signal that is received by the receiver; and a second determiner that collects a plurality of provisional determination results from the first determiner and determines collision or non-collision between the vehicle and the other vehicle based on the collected plurality of the provisional determination results.

According to one aspect, further improvement can be achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 illustrates a data structure of a management list which is stored in a second determination unit illustrated in FIG. 4;

Figure 1:
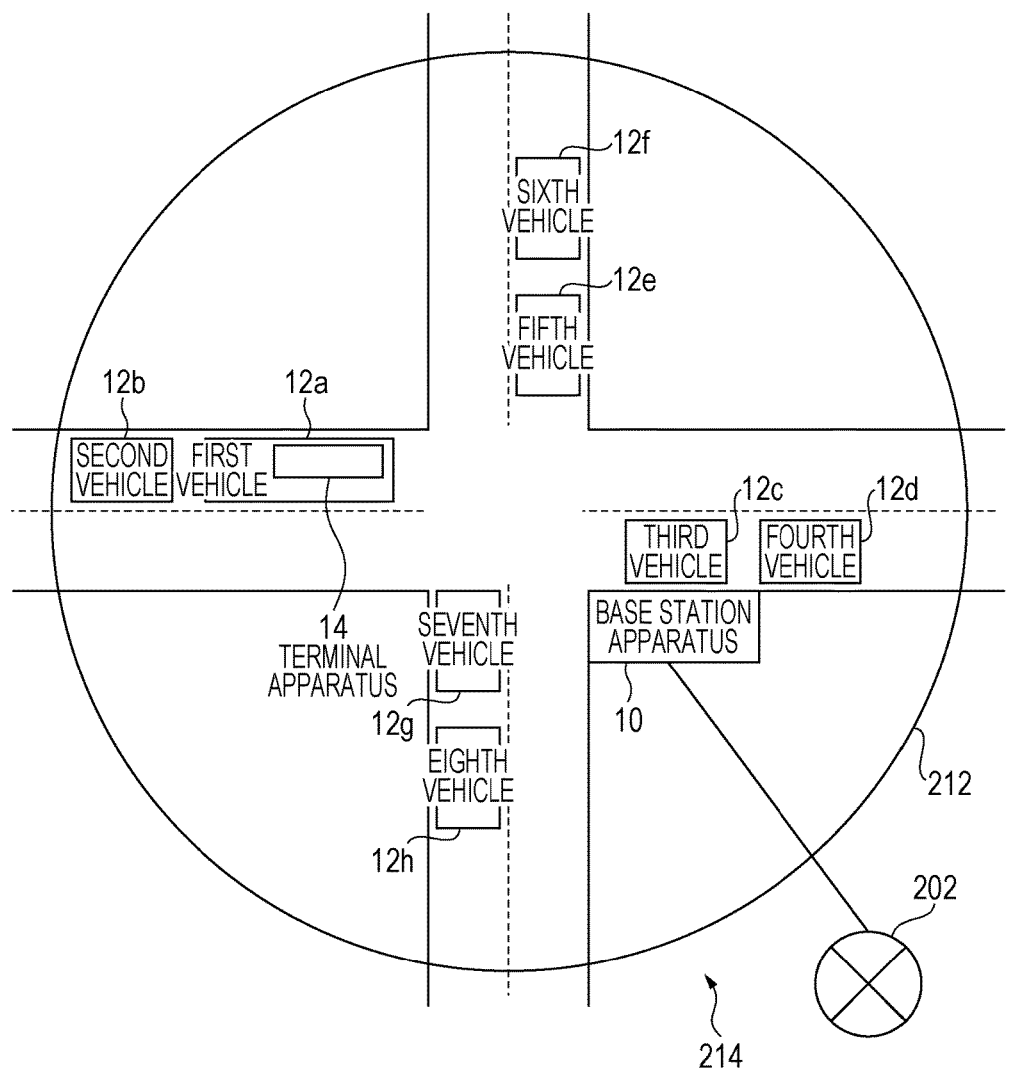
FIG. 1 illustrates a configuration of a communication system according to Embodiment 1 of this disclosure.

DETAILED DESCRIPTION (Underlying Knowledge Forming the Basis of the Present Disclosure)

In Japanese Unexamined Patent Application Publication No. 2000-348299, in a case where it is determined at predetermined intervals whether or not a course of a vehicle and a course of another vehicle will intersect, on the basis of a positional relationship therebetween, determination of collision or non-collision changes frequency. As a result, notification of a driver changes frequently, which results in insufficient support to the driver.

Therefore, the inventor has studied the following improvement measure in order to solve the above problem.

A radio apparatus according to one aspect of this disclosure is a radio apparatus that can be mounted in a vehicle. The radio apparatus includes an acquirer that acquires first positional information of a vehicle in which the radio apparatus is mounted; a receiver that receives, from another radio apparatus, a packet signal that includes at least second positional information of another vehicle in which the other radio apparatus is mounted; a first determiner that provisionally determines collision or non-collision between the vehicle and the other vehicle on the basis of the first positional information that is acquired by the acquirer and the second positional information included in the packet signal that is received by the receiver; and a second determiner that collects a plurality of provisional determination results from the first determiner and determines collision or non-collision between the vehicle and the other vehicle based on the collected plurality of the provisional determination results.

According to this aspect, a determination result based on a plurality of provisional determination results is obtained; therefore, a stable support for a driver can be provided.

Another aspect of this disclosure relates to a process apparatus. This process apparatus includes an acquirer that acquires a provisional determination result regarding collision or non-collision between a first vehicle and a second vehicle, that is determined on the basis of i) first positional information of the first vehicle in which a first radio apparatus that is mounted in a first vehicle is mounted and ii) second positional information of the second vehicle that is included in a packet signal that is received from a second radio apparatus by the first radio apparatus and that at least includes the second positional information of the second vehicle in which the second radio apparatus is mounted, and a determiner that collects a plurality of provisional determination results that is acquired by the acquirer over time and determines collision or non-collision between the first vehicle and the second vehicle based on the collected plurality of the provisional determination results.

According to this aspect, a determination result based on a plurality of provisional determination results is obtained; therefore, a stable support for a driver can be provided.

Another aspect of this disclosure relates to a process system. The process system includes a first radio apparatus that is mounted in a first vehicle, and a process apparatus that is connected to the first radio apparatus. The radio apparatus includes an acquirer that acquires first positional information of the first vehicle in which the first radio apparatus is mounted and a receiver that receives, from a second radio apparatus, a packet signal that includes at least second positional information of a second vehicle in which the second radio apparatus is mounted. The first radio apparatus or the process apparatus includes a first determiner that provisionally determines collision or non-collision between the first vehicle and the second vehicle on the basis of the first positional information that is acquired by the acquirer and the second positional information included in the packet signal that is received by the receiver. The process apparatus includes a second determiner that collects a plurality of provisional determination results from the first determiner and determines collision or non-collision between the first vehicle and the second vehicle based on the collected plurality of the provisional determination results.

According to this aspect, a determination result based on a plurality of provisional determination results is obtained; therefore, a stable support for a driver can be provided.

Embodiment 1

Before specifically describing an embodiment of this disclosure, a basic concept is described. Embodiment 1 of this disclosure relates to a communication system for performing inter-vehicle communication between terminal apparatuses mounted in vehicles and also road-to-vehicle communication from a base station apparatus installed at an intersection or the like to the terminal apparatus. The communication system is also referred to as an intelligent transport system (ITS). The communication system employs an access control function called carrier sense multiple access with collision avoidance (CSMA/CA) in a similar manner to a wireless local area network (LAN) conforming to the standard of IEEE802.11 or the like. Thus, a single radio channel is shared by a plurality of terminal apparatuses. Additionally, in ITS, information needs to be transmitted to an unspecified number of terminal apparatuses. To efficiently perform such transmission, the communication system transmits packet signals by broadcast.

In other words, in inter-vehicle communication, a terminal apparatus transmits a packet signal including information on a vehicle such as speed or position by broadcast. Another terminal apparatus receives the packet signal and detects an approach of the vehicle or the like on the basis of the aforementioned information. In order to reduce an interference between road-to-vehicle communication and inter-vehicle communication, the base station apparatus repeatedly specifies a frame including a plurality of subframes. For the road-to-vehicle communication, the base station apparatus selects any of the subframes and transmits a packet signal including control information or the like by broadcast at a start portion of the selected subframe.

The control information includes information on a period in which the base station apparatus transmits a packet signal by broadcast (hereinafter, such a period is referred to as a "road-to-vehicle transmission period"). The terminal apparatus specifies the road-to-vehicle transmission period on the basis of the control information, and transmits a packet signal in the CSMA protocol by broadcast in a period other than the road-to-vehicle transmission period (hereinafter, such a period is referred to as an "inter-vehicle transmission period"). In this way, the road-to-vehicle communication and the inter-vehicle communication are time-multiplexed. Note that a terminal apparatus which cannot receive the control information from the base station apparatus, that is, a terminal apparatus which is outside of an area defined by the base station apparatus, transmits a packet signal by broadcast in the CSMA protocol regardless of a structure of frames.

Depending on positions of one terminal apparatus and another terminal apparatus, the determination result is frequently changed between collision and non-collision, which results in inconsistent driver support. To provide a solution to this problem, in a terminal apparatus according to Embodiment 1, collision or non-collision is determined in a conventional manner and the result is defined as a provisional determination result. The terminal apparatus identifies the provisional determination result as a determination result when a provisional determination result which is different from the previous determination result is obtained repeatedly several times in succession. For example, when the determination result was previously non-collision and the provisional determination result turns out to be collision for a plurality of times in succession, the terminal apparatus changes the determination result to collision.

FIG. 1 illustrates a configuration of a communication system 100 according to Embodiment 1 of this disclosure. FIG. 1 illustrates a top view of an intersection. The communication system 100 includes a base station apparatus 10, a first vehicle 12a, a second vehicle 12b, a third vehicle 12c, a fourth vehicle 12d, a fifth vehicle 12e, a sixth vehicle 12f, a seventh vehicle 12g, and an eighth vehicle 12h, which are collectively referred to as vehicles 12, and a network 202. Each vehicle 12 is installed with a terminal apparatus 14, which is illustrated only on the first vehicle 12a in FIG. 1. An area 212 is formed around the base station apparatus 10, and the area outside the area 212 is referred to as an outer area 214.

As illustrated, a road in the left to right horizontal direction and a road in the top to bottom vertical direction intersect at the center. Here, the upper side of the drawing corresponds to north, the left side corresponds to west, the lower side corresponds to south, and the right side corresponds to east. The point where the two roads intersect is an "intersection". The first vehicle 12a and the second vehicle 12b travel from left to right, and the third vehicle 12c and the fourth vehicle 12d travel from right to left. The fifth vehicle 12e and the sixth vehicle 12f travel from top to bottom, and the seventh vehicle 12g and the eighth vehicle 12h travel from bottom to top.

In the communication system 100, the base station apparatus 10 is permanently positioned at the intersection. The base station apparatus 10 controls communication between the terminal apparatuses. The base station apparatus 10 repeatedly generates a frame including a plurality of subframes on the basis of a signal received from a global positioning system (GPS) satellite (not illustrated) or a frame formed in another base station apparatus 10 (not illustrated). Here, the start portion of each subframe can be set as the road-to-vehicle transmission period.

The base station apparatus 10 selects one of the subframes in which the road-to-vehicle transmission period is not set by the other base station apparatus 10. The base station apparatus 10 sets the road-to-vehicle transmission period at the start portion of the selected subframe. The base station apparatus 10 transmits a packet signal in the set road-to-vehicle transmission period. In the road-to-vehicle transmission period, a plurality of packet signals may be transmitted. In addition, the packet signal includes, for example, information about accidents, traffic jams, and traffic lights. Note that the packet signal also includes information on the timing at which the road-to-vehicle transmission period is set and control information of the frame.

As described above, the terminal apparatus 14 is mounted in the vehicle 12 and is mobile. When the terminal apparatus 14 receives a packet signal from the base station apparatus 10, the terminal apparatus 14 is estimated to be inside the area 212. When the terminal apparatus 14 is within the area 212, the terminal apparatus 14 generates a frame on the basis of the control information included in the received packet signal, specifically on the basis of the information about the frame and the information on the timing at which the road-to-vehicle transmission period is set. Consequently, the frame generated in each terminal apparatus 14 is synchronized with the frame generated in the base station apparatus 10. The terminal apparatus 14 transmits a packet signal in the inter-vehicle transmission period, which is different from the road-to-vehicle transmission period. In the inter-vehicle transmission period, data transmission in the CSMA/CA protocol is performed. On the other hand, when the terminal apparatus 14 is estimated to be in the outer area 214, the terminal apparatus 14 performs data transmission in the CSMA/CA protocol irrespective of the frame structure to transmit a packet signal. The terminal apparatus 14 receives a packet signal from another terminal apparatus 14, thereby detecting an approach of another vehicle 12 in which the other terminal apparatus 14 is mounted. Details of the detection will be described later.

Figure 2:
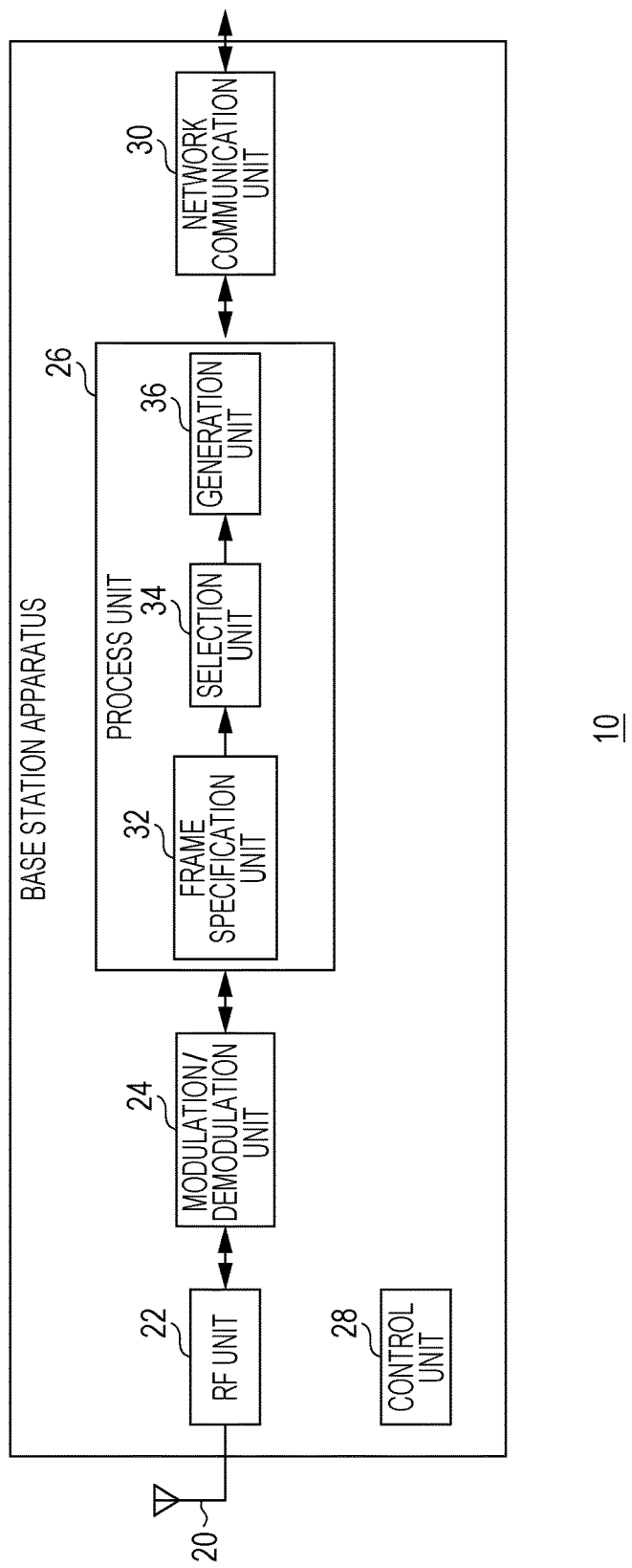
FIG. 2 illustrates a configuration of a base station apparatus illustrated in FIG. 1.

FIG. 2 illustrates a structure of the base station apparatus 10. The base station apparatus 10 includes an antenna 20, an RF unit 22, a modulation/demodulation unit 24, a process unit 26, a control unit 28, and a network communication unit 30. The process unit 26 includes a frame specification unit 32, a selection unit 34, and a generation unit 36.

The RF unit 22 receives a packet signal from a terminal apparatus 14 (not illustrated) or another base station apparatus 10 (not illustrated) by the antenna 20 as a reception process. The RF unit 22 converts the frequency of the received wireless frequency packet signal and generates a baseband packet signal. The RF unit 22 outputs the baseband packet signal to the modulation/demodulation unit 24. Typically, the baseband packet signal includes an in-phase component and a quadrature component and thus should be indicated by two signal lines, but only one signal line is illustrated herein for the purpose of simplifying the drawing. The RF unit 22 includes a low-noise amplifier (LNA), a mixer, an AGC, and an A/D conversion unit.

The RF unit 22 converts the frequency of the baseband packet signal accepted from the modulation/demodulation unit 24 and generates a wireless frequency packet signal as a transmission process. The RF unit 22 transmits the wireless frequency packet signal from the antenna 20 in the road-to-vehicle transmission period. The RF unit 22 includes a power amplifier (PA), a mixer, and a D/A conversion unit.

The modulation/demodulation unit 24 demodulates the baseband packet signal accepted from the RF unit 22 as a reception process. The modulation/demodulation unit 24 outputs a demodulation result to the process unit 26. The modulation/demodulation unit 24 modulates the data from the process unit 26 as a transmission process. The modulation/demodulation unit 24 outputs a modulation result as a baseband packet signal to the RF unit 22. Here, the communication system 100 is compatible with an orthogonal frequency division multiplexing (OFDM) modulation system, and thus the modulation/demodulation unit 24 both performs fast fourier transform (FFT) as a reception process and inverse fast fourier transform (IFFT) as a transmission process.

The frame specification unit 32 accepts a signal from a GPS satellite (not illustrated) and acquires time information from the accepted signal. A known technique may be used for acquiring the time information, and an explanation thereof is omitted here. The frame specification unit 32 generates a plurality of frames on the basis of the time information. For example, the frame specification unit 32 divides a period of "1 sec" into 10 with reference to the timings indicated by the time information to generate 10 "100-msec" frames. The process is repeated and thus the frames are defined as repeated. Note that the frame specification unit 32 may detect the control information from the demodulation result and generate a frame on the basis of the detected control information. Such a process corresponds to a generation process of a frame synchronized with a timing of a frame formed by another base station apparatus 10.

Figure 3:
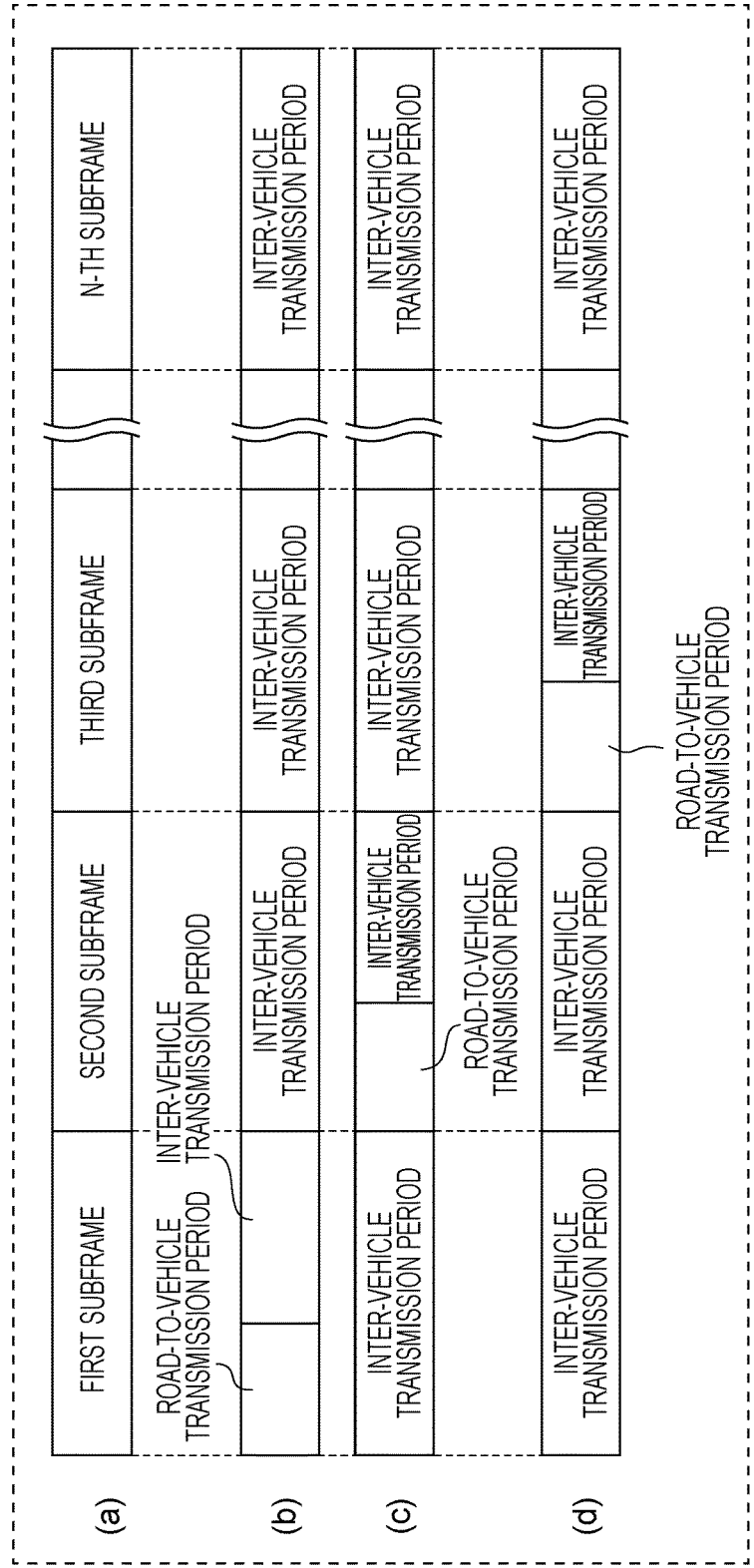
FIG. 3 illustrates a format of a frame specified in the communication system illustrated in FIG. 1.

FIG. 3 illustrates a format of frames specified in the communication system 100. Part (a) of FIG. 3 illustrates a structure of a frame. The frame includes N subframes from the first to the N-th subframes. The subframes which the terminal apparatus 14 uses for broadcasting are time multiplexed to form a frame. For example, when a length of the frame is 100 msec and N is 8, a subframe with a length of 12.5 msec is defined. N may be a number other than 8. The description of part (b) to (d) of FIG. 3 will be made later, and the description returns to FIG. 2.

The selection unit 34 selects, from among the subframes included in the frame, a subframe in which the road-to-vehicle transmission period is to be set. Specifically, the selection unit 34 accepts the frame defined in the frame specification unit 32. The selection unit 34 also accepts an instruction of the subframe to be selected via an interface (not illustrated) and selects a subframe corresponding to the instruction. The selection unit 34 may alternatively select a subframe automatically. In that case, the selection unit 34 accepts demodulation results of another base station apparatus 10 (not illustrated) or another terminal apparatus 14 (not illustrated) via the RF unit 22 and the modulation/demodulation unit 24. The selection unit 34 extracts a demodulation result from the other base station apparatus 10 from among the accepted demodulation results. The selection unit 34 specifies subframes, the demodulation result of which has been accepted, to specify the subframe, the demodulation result of which has not been accepted.

This process specifies an unused subframe, or a subframe in which any road-to-vehicle transmission period is not set by another base station apparatus 10. When there are a plurality of unused subframes, the selection unit 34 randomly selects one subframe. When there is no unused subframe, that is, when all subframes are used, the selection unit 34 acquires reception power of the demodulation results and preferentially selects a subframe with low reception power.

Part (b) of FIG. 3 illustrates a structure of a frame generated by a first base station apparatus 10a (not illustrated). The first base station apparatus 10a sets a road-to-vehicle transmission period at a start portion of the first subframe. The first base station apparatus 10a sets a period other than the road-to-vehicle transmission period in the first subframe and the second to the N-th subframes as an inter-vehicle transmission period. The inter-vehicle transmission period is a period in which the terminal apparatus 14 can transmit a packet signal. That is, the first base station apparatus 10a can transmit a packet signal in the road-to-vehicle transmission period at the start portion of the first subframe while the terminal apparatus 14 can transmit a packet signal in the inter-vehicle transmission period other than the road-to-vehicle transmission period in the frame.

Part (c) of FIG. 3 illustrates a structure of a frame generated by a second base station apparatus 10b (not illustrated). The second base station apparatus 10b sets the road-to-vehicle transmission period at the start portion of the second subframe. The second base station apparatus 10b sets a period other than the road-to-vehicle transmission period in the second subframe and the first and third to the N-th subframes as the inter-vehicle transmission period. Part (d) of FIG. 3 illustrates a structure of a frame generated by a third base station apparatus 10c (not illustrated). The third base station apparatus 10c sets the road-to-vehicle transmission period at a start portion of the third subframe. The third base station apparatus 10c sets a period other than the road-to-vehicle transmission period in the third subframe and the first, second, and fourth to the N-th subframes as the inter-vehicle transmission period. In this way, the base station apparatuses 10 select subframes different from one another, and sets the road-to-vehicle transmission period at the start portion of the selected subframes. The description returns to FIG. 2. The selection unit 34 outputs a selected subframe number to the generation unit 36.

The generation unit 36 accepts the subframe number from the selection unit 34. The generation unit 36 sets the road-to-vehicle transmission period in the subframe of the accepted number and generates a packet signal which is to be transmitted in the road-to-vehicle transmission period. When a plurality of packet signals are to be transmitted in a single road-to-vehicle transmission period, the generation unit 36 generates the plurality of packet signals. A packet signal includes control information and payload. The control information includes the subframe number in which the road-to-vehicle transmission period is set, for example. The payload includes information about accidents, traffic jams, and traffic lights, for example. These kinds of data are obtained by the network communication unit 30 via the network 202 (not illustrated). The process unit 26 causes the modulation/demodulation unit 24 and the RF unit 22 to transmit the packet signal by broadcast in the road-to-vehicle transmission period. The control unit 28 controls the entire process in the base station apparatus 10.

This structure can be realized by including hardware such as a CPU, a memory, or other LSI in any computer, or software such as a program loaded into a memory. Here, the functional blocks realized in their association are illustrated. Thus, those skilled in the art should understand that the functional blocks can be realized in any form such as hardware only, software only, or a combination thereof.

Figure 4:
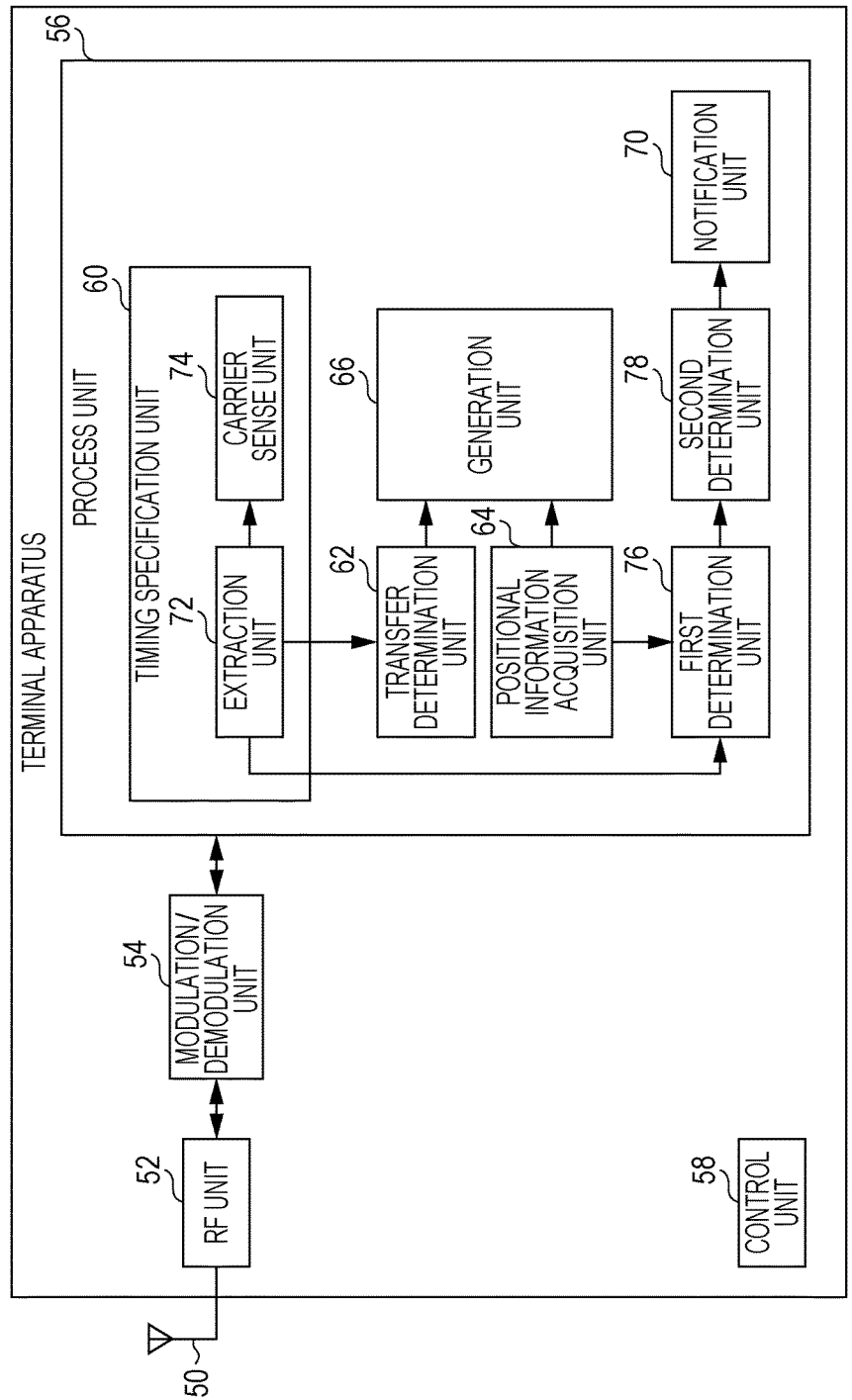
FIG. 4 illustrates a configuration of a terminal apparatus illustrated in FIG. 1.

FIG. 4 illustrates a structure of the terminal apparatus 14. The terminal apparatus 14 includes an antenna 50, an RF unit 52, a modulation/demodulation unit 54, a process unit 56, and a control unit 58. The process unit 56 includes a timing specification unit 60, a transfer determination unit 62, a positional information acquisition unit 64, a generation unit 66, a first determination unit 76, a second determination unit 78, and a notification unit 70. The timing specification unit 60 includes an extraction unit 72 and a carrier sense unit 74. As described above, the terminal apparatus 14 can be mounted in the vehicle 12. The antenna 50, the RF unit 52, and the modulation/demodulation unit 54 execute a similar process to the antenna 20, the RF unit 22, and the modulation/demodulation unit 24 in FIG. 2. Thus, mainly differences will be described herein.

The modulation/demodulation unit 54 and the process unit 56 receive a packet signal from the other terminal apparatus 14 or a base station apparatus 10 (not illustrated) as a reception process. As described above, the modulation/demodulation unit 54 and the process unit 56 receive a packet signal from the base station apparatus 10 in the road-to-vehicle transmission period and receive a packet signal from another terminal apparatus 14 in the inter-vehicle transmission period. A packet signal from the other terminal apparatus 14 includes at least a position, a travelling direction, a moving speed, and the like (which will be collectively referred to as "position information" hereinafter) of another vehicle 12 in which the other terminal apparatus 14 is mounted. A known technique may be used for the acquisition of the positional information of the other terminal apparatus 14, and thus an explanation thereof is omitted here.

When a demodulation result from the modulation/demodulation unit 54 represents a packet signal from the base station apparatus 10 (not illustrated), the extraction unit 72 specifies a timing of a subframe in which the road-to-vehicle transmission period is set. At this time, the extraction unit 72 is estimated to be within the area 212 of FIG. 1. The extraction unit 72 generates a frame on the basis of the timing of the subframe and message header content of the packet signal, specifically, the length of time of the road-to-vehicle transmission period. The frame may be generated in a manner similar to that in the frame specification unit 32, and thus an explanation thereof is omitted here. The extraction unit 72 generates a frame synchronized with the frame which is formed in the base station apparatus 10. When the packet signal is transmitted from the other terminal apparatus 14, the extraction unit 72 omits a generation process of a synchronized frame, but extracts positional information in the packet signal and outputs the positional information to the first determination unit 76.

On the other hand, if a packet signal from the base station apparatus 10 is not received, the extraction unit 72 estimates that the terminal apparatus 14 is in the outer area 214 of FIG. 1. When the terminal apparatus 14 is estimated to be within the area 212, the extraction unit 72 selects the inter-vehicle transmission period. When the terminal apparatus 14 is estimated to be in the outer area 214, the extraction unit 72 selects a timing irrespective of the frame structure. When the inter-vehicle transmission period is selected, the extraction unit 72 outputs the information on the timings of the frame and the subframe and the inter-vehicle transmission period to the carrier sense unit 74. When a timing irrespective of the frame structure is selected, the extraction unit 72 instructs the carrier sense unit 74 to perform carrier sensing.

The carrier sense unit 74 accepts the information on the timings of the frame and the subframe and the inter-vehicle transmission period from the extraction unit 72. The carrier sense unit 74 determines a transmission timing by starting the CSMA/CA in the inter-vehicle transmission period. On the other hand, when the carrier sense unit 74 is instructed to perform carrier sensing irrespective of the frame structure from the extraction unit 72, the carrier sense unit 74 performs CSMA/CA to determine a transmission timing irrespective of the frame structure. The carrier sense unit 74 notifies the determined transmission timing to the modulation/demodulation unit 54 and the RF unit 52 to transmit a packet signal by broadcast.

The transfer determination unit 62 controls transmission of the control information. The transfer determination unit 62 extracts information to be transmitted from the control information. The transfer determination unit 62 generates information to be transmitted on the basis of the extracted information. An explanation of this process is omitted here. The transfer determination unit 62 outputs the information to be transmitted, that is, a part of the control information to the generation unit 66.

The positional information acquisition unit 64 includes a GPS receiver, a gyroscope, a vehicle speed sensor, and the like (not illustrated), with which the positional information acquisition unit 64 obtains data to acquire information of a position, a travelling direction, a moving speed, and the like (as mentioned above, which will be collectively referred to as "positional information") of the vehicle 12 (not illustrated), that is, the vehicle 12 in which the terminal apparatus 14 is mounted. Note that the position is indicated by latitude and longitude coordinates. A known technique may be used for the acquisition, and thus an explanation thereof is omitted here. The positional information acquisition unit 64 outputs the positional information to the generation unit 66 and the first determination unit 76.

The generation unit 66 accepts the positional information from the positional information acquisition unit 64 and accepts a part of the control information from the transfer determination unit 62. The generation unit 66 generates a packet signal including the information and transmits the generated packet signal by broadcast via the modulation/demodulation unit 54, the RF unit 52, and the antenna 50 at the transmission timing determined in the carrier sense unit 74. This process corresponds to inter-vehicle communication.

The positional information is accepted from the positional information acquisition unit 64 and the extraction unit 72 to the first determination unit 76. The positional information accepted from the positional information acquisition unit 64 corresponds to the positional information of another vehicle 12, while the positional information accepted from the extraction unit 72 corresponds to the positional information of the vehicle 12 in which the first determination unit 76 is mounted. The first determination unit 76 provisionally determines collision or non-collision of the vehicle 12 with the other vehicle 12 on the basis of the positional information of the vehicle 12 and the other vehicle 12. A known technique may be used to provisionally determine collision or non-collision. For example, a future position of the vehicle 12 in which the first determination unit 76 is mounted is estimated in accordance with the present position, the travelling direction, and the moving speed of the vehicle 12 in which the first determination unit 76 is mounted, while a future position of the other vehicle 12 is estimated in accordance with the present position, the travelling direction, and the moving speed of the other vehicle 12; a provisional determination result of the first determination unit 76 is collision when the two future positions are close to each other, and non-collision if not. The two future positions are determined to be close to each other when the proximity therebetween exceeds a threshold value. Otherwise, they are determined not to be approximate to each other. Such provisional determination is performed periodically, for example every 100 msec, which is equal to a frame cycle. The first determination unit 76 outputs the provisional determination result to the second determination unit 78.

A provisional determination result of the first determination unit 76 is accepted to the second determination unit 78. The second determination unit 78 collects plural provisional determination results over time to determine whether or not the vehicle 12 and the other vehicle 12 will collide. Specifically, when the determination result was previously "non-collision" and when the provisional determination result turns out to be "collision" N times in succession, the second determination unit 78 changes the determination result to "collision". On the other hand, when the preceding determination result was previously "collision" and when the provisional determination result turns out to be "non-collision" M times in succession, the second determination unit 78 changes the determination result to "non-collision". Here, N is smaller than M. N and M are positive integral numbers. For example, N may be 3 and M may be 4. Thus, a result which requires caution, that is, the determination of collision, is more easily obtained for the purpose of fail-safe operation.

In order to perform such determination, the second determination unit 78 summarizes the provisional determination results in a table (hereinafter referred to as a "management list"). In other words, when a provisional determination result is accepted, the second determination unit 78 updates the management list. When the management list satisfies the above condition, the second determination unit 78 changes the determination result.

FIG. 5 illustrates a data structure of the management list stored in the second determination unit 78. An "ID" indicates an identification number to identify other vehicles 12, an "update flag" indicates whether update with 100 msec intervals is finished or not. An "immediate determination result" indicates the latest provisional determination result in the first determination unit 76, which is either "collision" or "non-collision". Further, the "number of collision provisional determinations in succession" indicates the number of times the provisional determination result is "collision" in succession, while the "number of non-collision provisional determinations in succession" indicates the number of times the provisional determination result is "non-collision" in succession. The "stabilized determination result" indicates a determination result.

Figure 6:
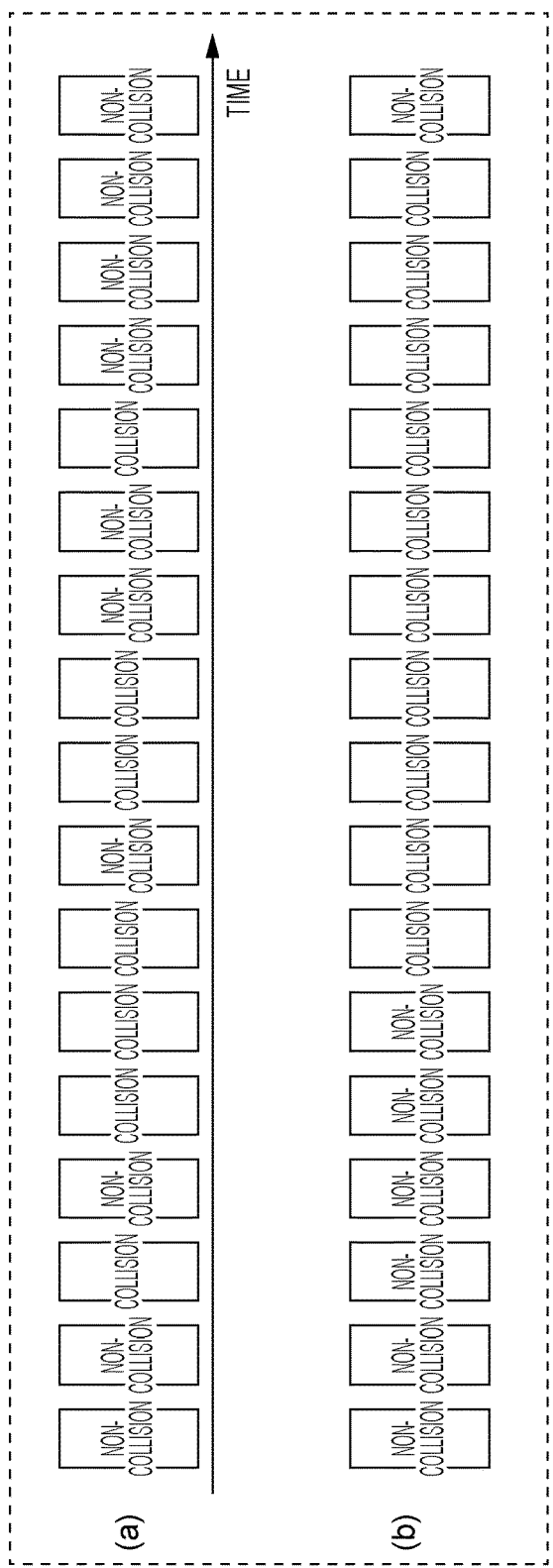
FIG. 6 illustrates a provisional determination result and a determination result of the terminal apparatus illustrated in FIG. 4.

FIG. 6 illustrates provisional determination results and determination results in the terminal apparatus 14. Part (a) of FIG. 6 illustrates provisional determination results in the first determination unit 76 and part (b) of FIG. 6 illustrates determination results in the second determination unit 78 in a case where N is 3 and M is 4. The description returns to FIG. 4. The second determination unit 78 outputs the determination result to the notification unit 70.

The notification unit 70 displays a content of a received packet signal on a display or the like (not illustrated). The determination result is accepted from the second determination unit 78 to the notification unit 70. The notification unit 70 notifies the determination result to a driver via a monitor or a speaker. Further, the notification unit 70 also notifies the information in the packet signal received from the base station apparatus 10 to the driver via a monitor or a speaker.

Figure 7:
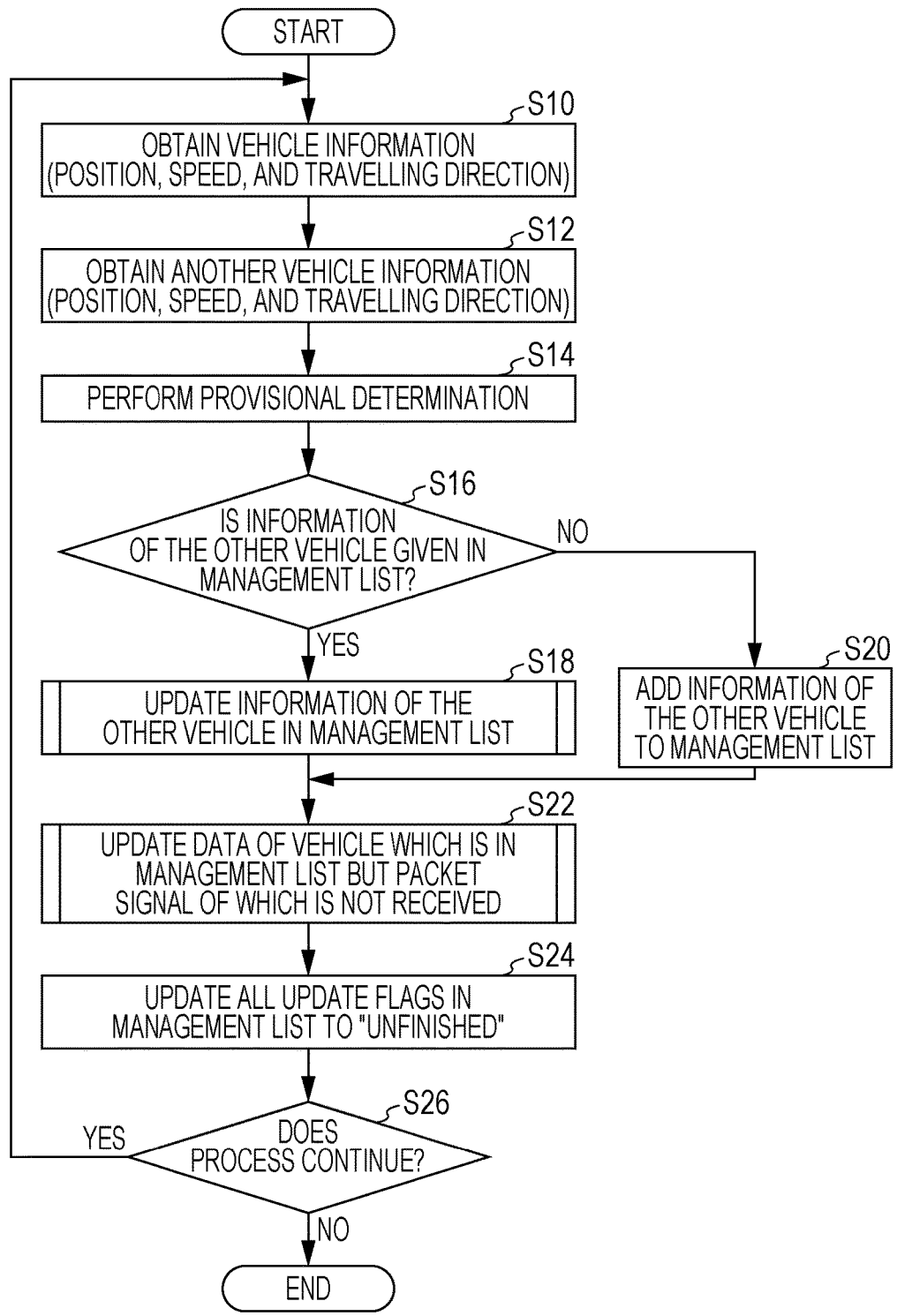
FIG. 7 is a flowchart of a determination process by the terminal apparatus illustrated in FIG. 4.

An operation of the communication system 100 with the above structure will be described. FIG. 7 is a flowchart of a determination process of the terminal apparatus 14. The positional information acquisition unit 64 obtains information (a position, a speed, and a travelling direction) of the vehicle in which the terminal apparatus 14 is mounted (S10), the extraction unit 72 obtains another vehicle information (a position, a speed, and a travelling direction) (S12). The first determination unit 76 provisionally determines collision or non-collision between the vehicles (S14). If the information of the other vehicle is given in the management list (Yes in S16), the second determination unit 78 updates the information of the other vehicle in the management list (S18). On the other hand, if the information of the other vehicle is not given in the management list (No in S16), the second determination unit 78 adds the information of the other vehicle to the management list (S20). In other word, the second determination unit 78 sets the immediate determination result to a provisional determination result, the number of collision provisional determinations in succession to "0", the number of non-collision provisional determinations in succession to "0", the stabilized determination result to "non-collision", and the update flag column to "finished". Further, the second determination unit 78 updates information of a vehicle which is in the management list but the packet signal of which is not received, that is data of a vehicle whose update flag is "unfinished" (S22). The second determination unit 78 updates all update flags in the management list to "unfinished" (S24). When the process is selected to continue, the process returns to Step 10 (Yes in S26). When the process is selected not to continue (No in S26), the process ends.

Figure 8:
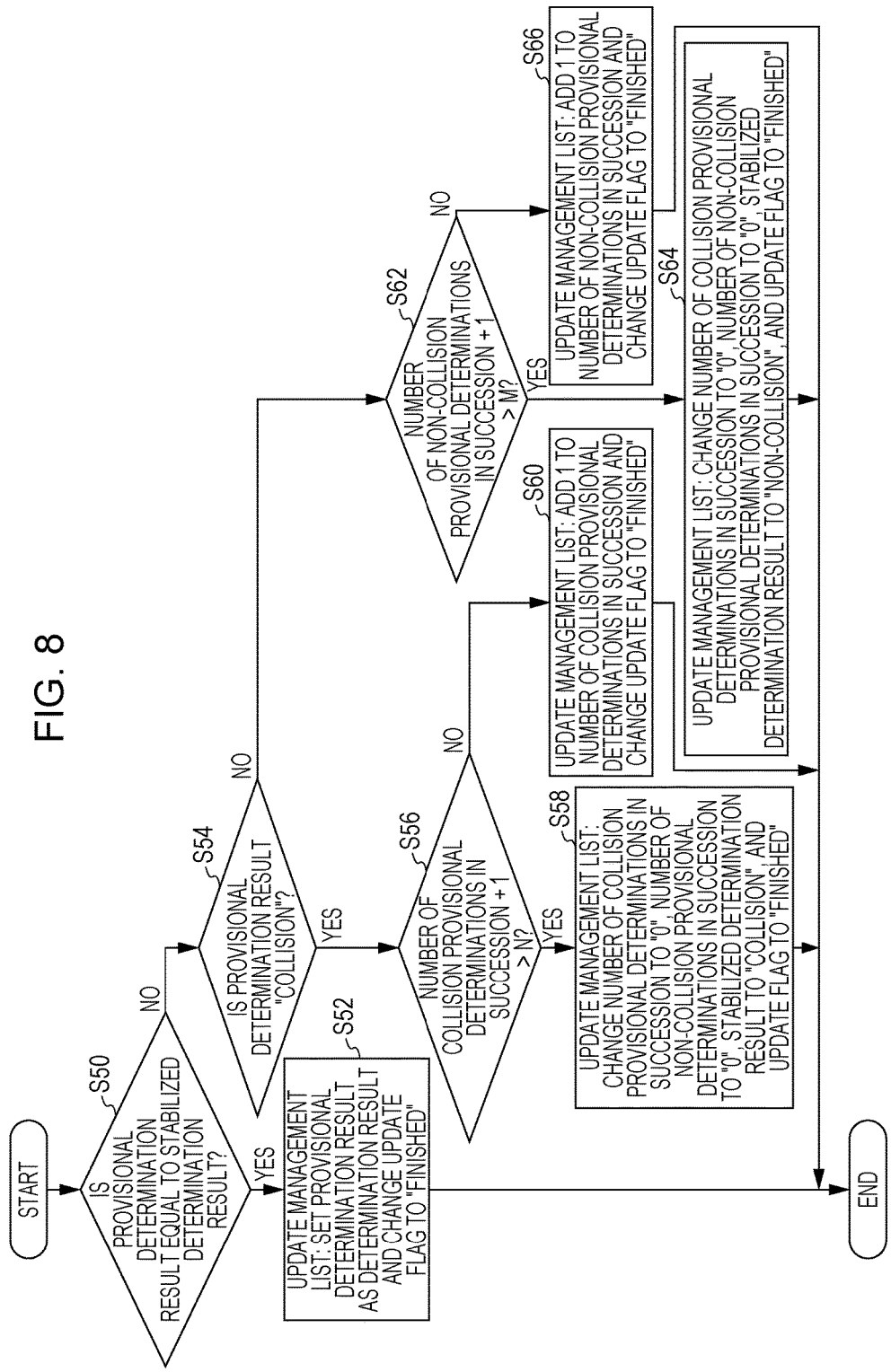
FIG. 8 is a flowchart of an update process by the terminal apparatus illustrated in FIG. 4.

FIG. 8 is a flowchart of an update process of the terminal apparatus 14. The flowchart of FIG. 8 corresponds to Step 18 in FIG. 7. When the provisional determination result is equal to the stabilized determination result (Yes in S50), the second determination unit 78 updates the management list by setting the provisional determination result as a determination result and changing the update flag to "finished" (S52). The stabilized determination result obtained is the same as the preceding determination result. When the provisional determination result is not equal to a stabilized determination result (No in S50), if the provisional determination result is "collision" (Yes in S54), and the number of collision provisional determinations in succession +1>N is satisfied (Yes in S56), the second determination unit 78 updates the management list (S58). Specifically, the second determination unit 78 sets the number of collision provisional determinations in succession to "0", the number of non-collision provisional determinations in succession to "0", the stabilized determination result to "collision", and the update flag to "finished". If the number of collision provisional determinations in succession +1>N is not satisfied (No in S56), the second determination unit 78 updates the management list by adding 1 to the number of collision provisional determinations in succession and changing the update flag to "finished" (S60).

If the provisional determination result is not "collision" (No in S54), and the number of non-collision provisional determinations in succession +1>M is satisfied (Yes in S62), the second determination unit 78 updates the management list (S64). Specifically, the second determination unit 78 sets the number of collision provisional determinations in succession to "0", the number of non-collision provisional determinations in succession to "0", the stabilized determination result to "non-collision", and the update flag to "finished". If the number of non-collision provisional determinations in succession +1>M is not satisfied (No in S62), the second determination unit 78 updates the management list by adding 1 to the number of non-collision provisional determinations in succession and changing the update flag to "finished" (S66).

Figure 9:
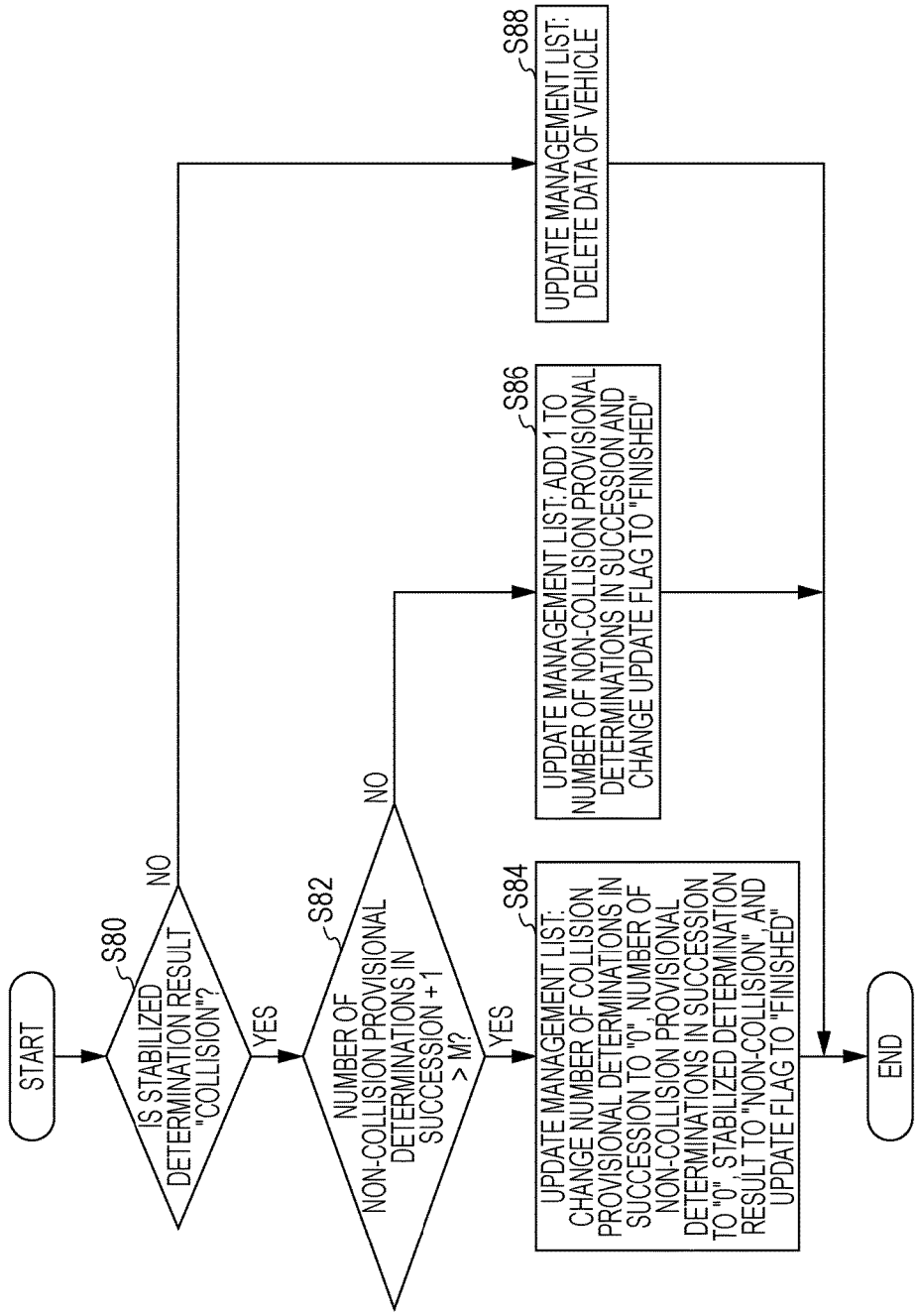
FIG. 9 is a flowchart of another update process of the terminal apparatus illustrated in FIG. 4.

FIG. 9 is a flowchart of another update process of the terminal apparatus 14. The flowchart of FIG. 9 corresponds to Step 22 in FIG. 7 where the management list is updated for a vehicle of which update flag is "unfinished". If the stabilized determination result is "collision" (Yes in S80), and the number of non-collision provisional determinations in succession +1>M is satisfied (Yes in S82), the second determination unit 78 updates the management list (S84). Specifically, the second determination unit 78 sets the number of collision provisional determinations in succession to "0", the number of non-collision provisional determinations in succession to "0", the stabilized determination result to "non-collision", and the update flag to "finished". If the number of non-collision provisional determinations in succession +1>M is not satisfied (No in S82), the second determination unit 78 updates the management list by adding 1 to the number of non-collision provisional determinations in succession and changing the update flag to "finished" (S86). If the stabilized determination result is not "collision" (No in S80), the second determination unit 78 updates the management list by deleting the data of the vehicle (S88).

According to an embodiment of this disclosure, a determination result is changed when the same provisional determination result is obtained plural times in succession; therefore, frequent changes of the determination result can be avoided, which leads to stable support for a driver. In addition, since N is set to be smaller than M, false determination of non-collision can be suppressed, which suppresses collision accidents of vehicles.

Embodiment 2

Then, Embodiment 2 of this disclosure will be described. As in Embodiment 1, Embodiment 2 relates to a terminal apparatus that determines collision or non-collision with another vehicle on the basis of a packet signal received from another terminal apparatus which is mounted in the other vehicle. In a terminal apparatus according to Embodiment 1, when the same provisional determination result comes out in succession, the provisional determination result is identified as a determination result. On the other hand, in a terminal apparatus according to Embodiment 2, when a rate of either provisional determination result exceeds a threshold value in a predetermined number of provisional determination results, the provisional determination result is identified as a determination result. The communication system 100 in Embodiment 2 is of a type similar to that in FIG. 1, the base station apparatus 10 in Embodiment 2 is of a type similar to that in FIG. 2, and the terminal apparatus 14 in Embodiment 2 is of a type similar to that in FIG. 4. Thus, differences will be mainly described herein.

In FIG. 4, the provisional determination result of the first determination unit 76 is accepted to the second determination unit 78. The second determination unit 78, as in Embodiment 1, collects plural provisional determination results over time to determine whether or not the vehicle 12 and another vehicle 12 will collide. Specifically, when the preceding determination result was "non-collision" and when the rate of the collision provisional determination result in plural provisional determination results exceeds a first threshold value, the second determination unit 78 changes the determination result to "collision". Here, the plural provisional determination results means the latest provisional determination results of the predetermined number. For example, the predetermined number may be 10. On the other hand, when the preceding determination result was "collision" and the rate of the non-collision provisional determination result in plural provisional determination results exceeds a second threshold value, the second determination unit 78 changes the determination result to "non-collision". Here, the first threshold value is smaller than the second threshold value.

According to an embodiment of this disclosure, a determination result is changed when the rate of the same provisional determination result in a predetermined number of provisional determination results is high; therefore, frequent changes of the determination result can be avoided. In addition, since the first threshold value is smaller than the second threshold value, false determination of non-collision can be suppressed.

Embodiment 3

Then, Embodiment 3 of this disclosure will be described. As in Embodiments 1 and 2, Embodiment 3 relates to a terminal apparatus that receives a packet signal from another terminal apparatus. In Embodiments 1 and 2, the terminal apparatus determines and communicates collision or non-collision between a vehicle and another vehicle in which another terminal apparatus is mounted. On the other hand, in Embodiment 3, a process apparatus which is provided separately from the terminal apparatus performs such a function. The communication system 100 in Embodiment 3 is of a type similar to that in FIG. 1 and the base station apparatus 10 in Embodiment 3 is of a type similar to that in FIG. 2. Thus, differences will be mainly described herein.

Figure 10:
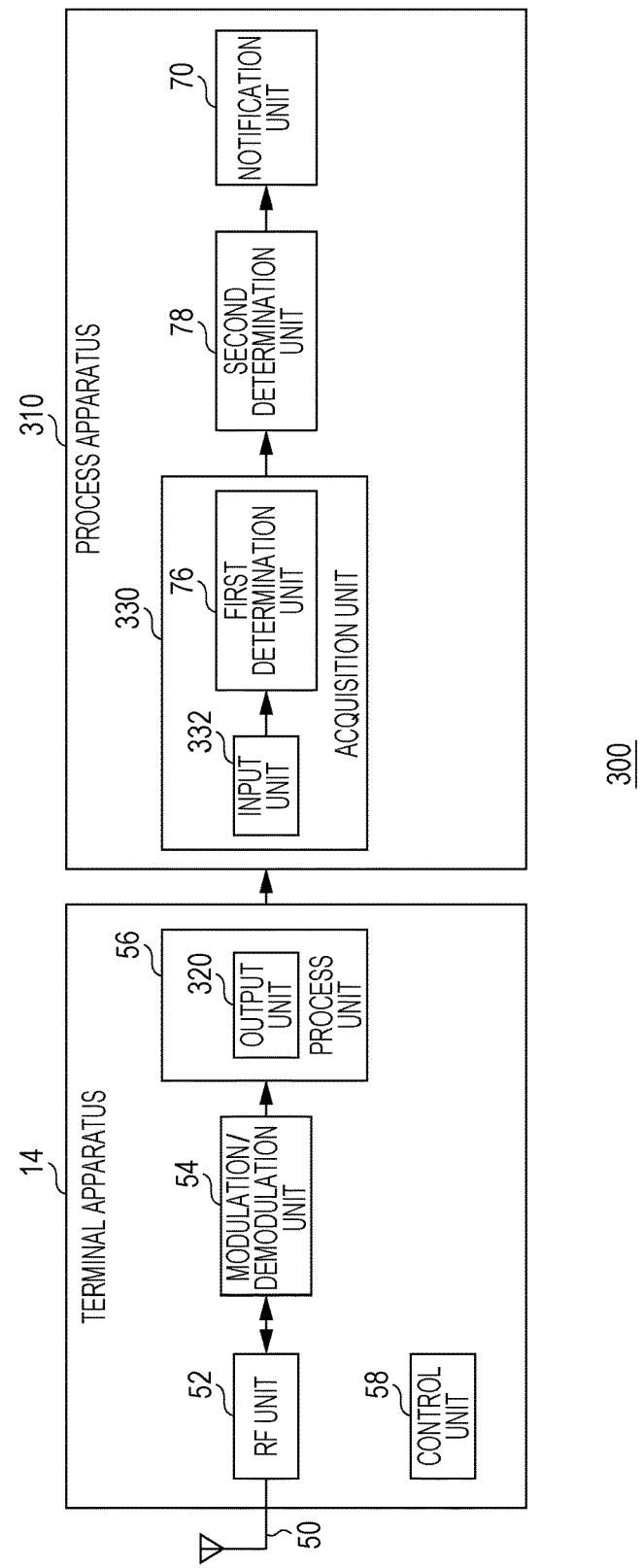
FIG. 10 illustrates a configuration of a process system according to Embodiment 3 of this disclosure.

FIG. 10 illustrates a configuration of a process system 300 according to Embodiment 3 of this disclosure. The process system 300 includes the terminal apparatus 14 and a process apparatus 310. The terminal apparatus 14 includes the antenna 50, the RF unit 52, the modulation/demodulation unit 54, the process unit 56, and the control unit 58. The process unit 56 includes an output unit 320. The process apparatus 310 includes an acquisition unit 330, the second determination unit 78, and the notification unit 70. The acquisition unit 330 includes an input unit 332 and the first determination unit 76.

The terminal apparatus 14 and the process apparatus 310 are linked by wired or wireless connection or the like. Such a connection may be formed by a known technique and an explanation thereof is omitted here. As compared to the terminal apparatus 14 of FIG. 4, the terminal apparatus 14 of FIG. 10 does not include the first determination unit 76, the second determination unit 78, and the notification unit 70. The process unit 56 includes the output unit 320. The output unit 320 outputs information extracted by the extraction unit 72, for example, positional information included in a packet signal to the process apparatus 310. In addition, the output unit 320 also outputs positional information of the vehicle 12 to the process apparatus 310.

The process apparatus 310 is, for example, an on-vehicle apparatus such as a car navigation apparatus and is mounted in the vehicle 12. The input unit 332 accepts information from the output unit 320 and outputs the accepted information to the first determination unit 76. The first determination unit 76 may also be referred to as a provisional determination unit. The process in the first determination unit 76, the second determination unit 78, and the notification unit 70 is similar to that has been described above and an explanation thereof is omitted here.

Figure 11:
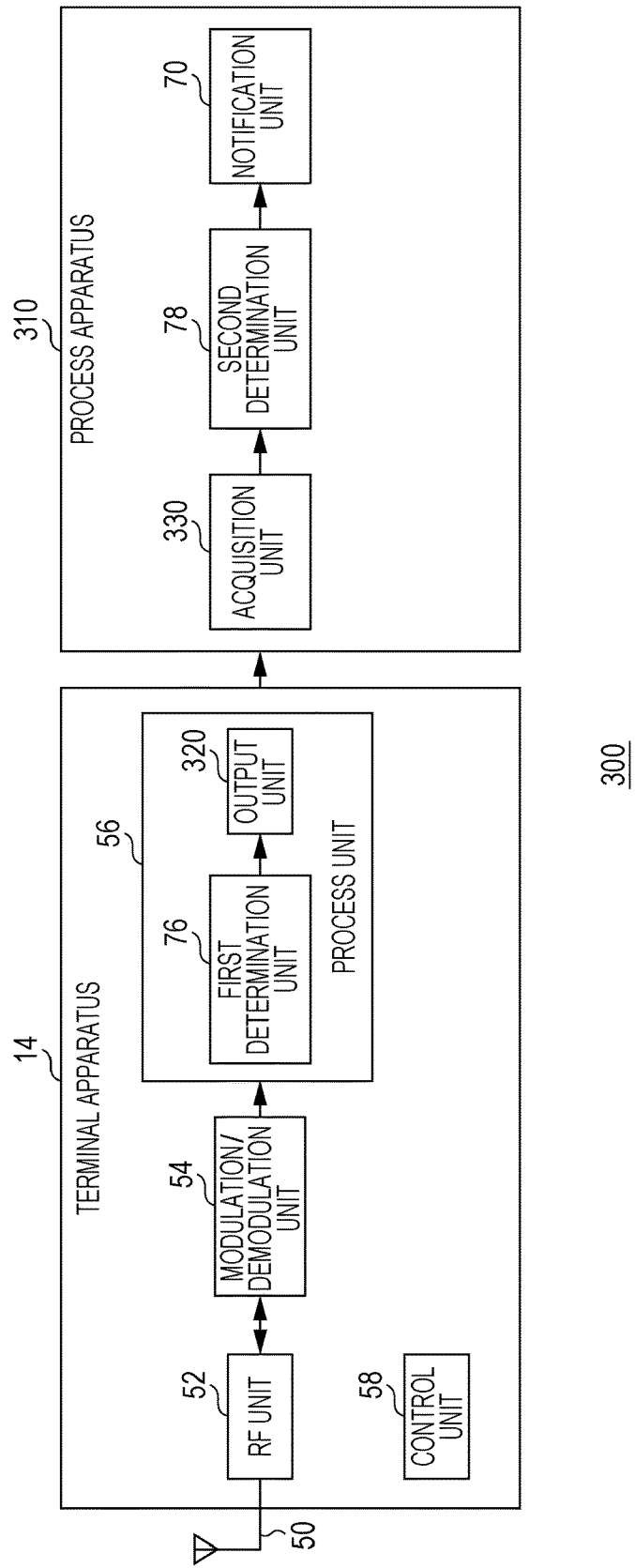
FIG. 11 illustrates another configuration of a process system according to Embodiment 3 of this disclosure.

FIG. 11 illustrates another configuration of the process system 300 according to Embodiment 3 of this disclosure. The process system 300 includes the terminal apparatus 14 and the process apparatus 310. The terminal apparatus 14 includes the antenna 50, the RF unit 52, the modulation/demodulation unit 54, the process unit 56, and the control unit 58. The process unit 56 includes the first determination unit 76 and the output unit 320. The process apparatus 310 includes the acquisition unit 330, the second determination unit 78, and the notification unit 70.

As compared to the terminal apparatus 14 of FIG. 4, the terminal apparatus 14 of FIG. 11 does not include the second determination unit 78 and the notification unit 70. The process unit 56 includes the first determination unit 76 and the output unit 320. The first determination unit 76 performs provisional determination as described above and outputs the provisional determination result to the output unit 320. The output unit 320 outputs the provisional determination result to the process apparatus 310. The acquisition unit 330 accepts the output unit 320 and outputs the provisional determination result to the second determination unit 78. The process in the second determination unit 78 and the notification unit 70 is similar to that has been described above and an explanation thereof is omitted here.

Figure 12:
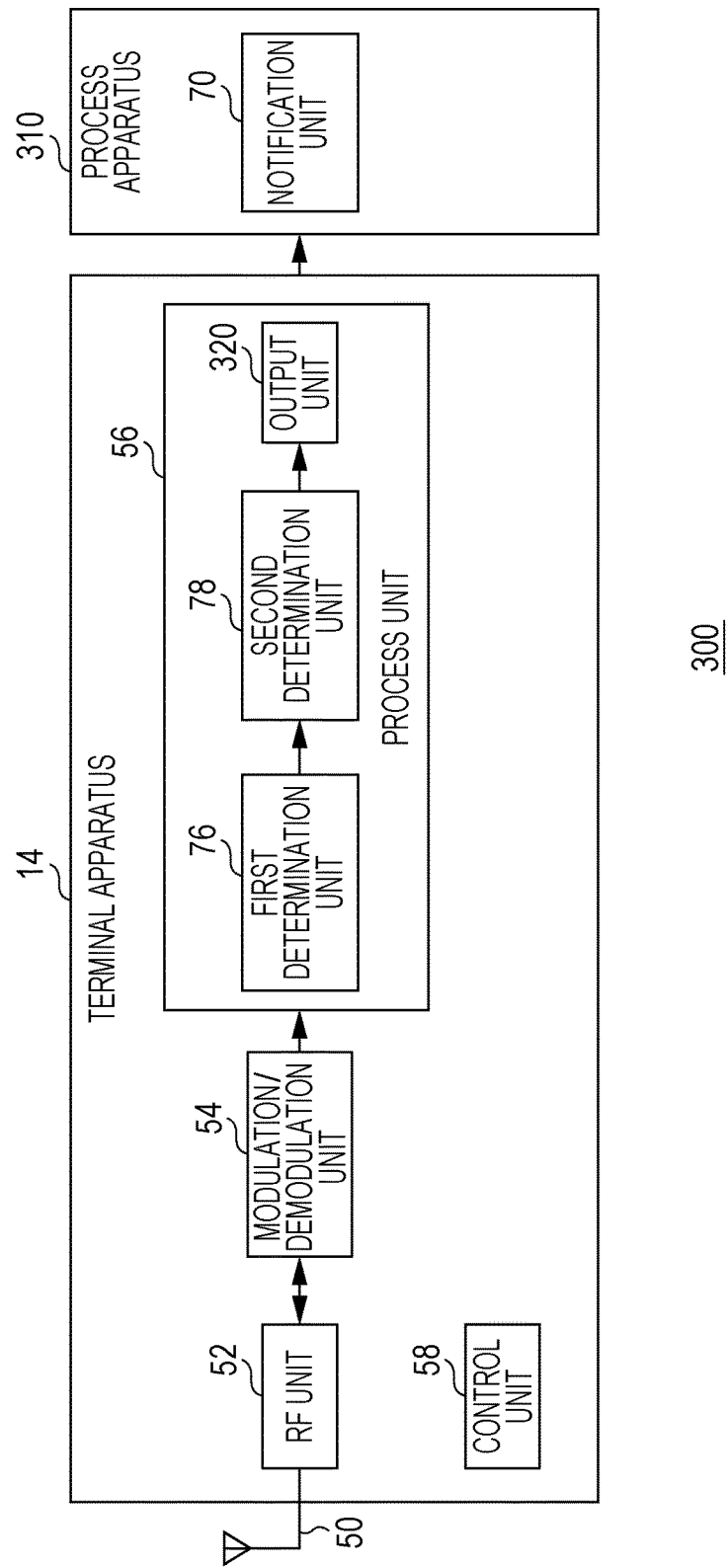
FIG. 12 illustrates another configuration of a process system according to Embodiment 3 of this disclosure.

FIG. 12 illustrates another configuration of the process system 300 according to Embodiment 3 of this disclosure. The process system 300 includes the terminal apparatus 14 and the process apparatus 310. The terminal apparatus 14 includes the antenna 50, the RF unit 52, the modulation/demodulation unit 54, the process unit 56, and the control unit 58. The process unit 56 includes the first determination unit 76, the second determination unit 78, and the output unit 320. The process apparatus 310 includes the notification unit 70.

As compared to the terminal apparatus 14 of FIG. 4, the terminal apparatus 14 of FIG. 12 does not include the notification unit 70. The process unit 56 includes the first determination unit 76, the second determination unit 78, and the output unit 320. The first determination unit 76 and the second determination unit 78 perform processes as described above and output the determination result to the output unit 320. The output unit 320 outputs the determination result to the process apparatus 310. The notification unit 70 accepts the determination result from the output unit 320 and performs notification as described above.

According to an embodiment of this disclosure, the configuration of the terminal apparatus can be simplified in a case where the first determination unit, the second determination unit, and the notification unit are provided in an outer process apparatus. Also, the configuration of the terminal apparatus can be simplified in a case where the second determination unit and the notification unit are provided in the outer process apparatus. Further alternatively, flexibility in the configuration can be improved in a case where the notification unit is provided in the outer process apparatus.

This disclosure has been described above by way of the embodiment. The embodiments are exemplary, and those skilled in the art may understand that various modifications of combination of the components and the processes are possible and such modifications are also encompassed in the scope of this disclosure.

Although Embodiments 1 and 3 in this disclosure describe the procedure for provisionally determining collision or non-collision between vehicles, the procedure is not limited to those described above. Any procedure may be employed as long as it performs hysteresis determination where M successive "collision" provisional determination results make the determination result "collision", while N successive "non-collision" provisional determination results make the determination result "non-collision".

In Embodiments 1 and 3 of this disclosure, N is defined as a threshold value for changing a determination result from "non-collision" to "collision". N is a positive integral number. Note that N may be 1. According to this modification, collision can be notified immediately.

In Embodiments 1 to 3 of this disclosure, the second determination unit 78 determines a determination result on the basis of a plurality of provisional determination results. However, this disclosure is not limited thereto. For example, at a start portion of the process when a plurality of provisional determination results have not been collected, the second determination unit 78 may output a provisional determination result as a determination result as it is. According to this modification, the determination result can be early notified.

In Embodiments 1 to 3 of this disclosure, the communication system 100 is used in a system for preventing collision with oncoming vehicles. However, this disclosure is not limited thereto. For example, the communication system 100 may be used for service in/out determination or route determination in an emergency vehicle transport support. According to this modification, the application range of the communication system 100 can be widened.

An outline of one aspect of this disclosure is described below. A radio apparatus according to one aspect of this disclosure is a radio apparatus that can be mounted in a vehicle. The radio apparatus includes an acquirer that acquires positional information of a vehicle in which the radio apparatus is mounted; a receiver that receives, from another radio apparatus, a packet signal that includes at least second positional information of another vehicle in which the other radio apparatus is mounted; a first determiner that provisionally determines collision or non-collision between the vehicle and the other vehicle on the basis of the first positional information that is acquired by the acquirer and the second positional information included in the packet signal that is received by the receiver; and a second determiner that collects a plurality of provisional determination results from the first determiner and determines collision or non-collision between the vehicle and the other vehicle based on the collected plurality of the provisional determination results.

According to this aspect, a determination result based on a plurality of provisional determination results is obtained; therefore, a stable support for a driver can be provided.

The second determiner may change a determination result to collision when the provisional determination result has been collision N times in succession and when the determination result was previously non-collision, and change the determination result to non-collision when the provisional determination result has been non-collision M times in succession and when the determination result was previously collision. N is smaller than M in the second determiner. N and M are positive integral numbers. In this case, since N is set to be smaller than M, false determination of non-collision can be suppressed.

The second determiner may change a determination result to collision when a rate of collision in a plurality of provisional determination results exceeds a first threshold value and when the determination result was previously non-collision and the second determiner change a determination result to non-collision when a rate of non-collision in a plurality of provisional determination results exceeds a second threshold value and when the determination result was previously collision. The first threshold value is smaller than the second threshold value in the second determiner. In this case, since the first threshold value is set to be smaller than the second threshold value, false determination of non-collision can be suppressed.

Another aspect of this disclosure relates to a process apparatus. This process apparatus includes an acquirer that acquires a provisional determination result regarding collision or non-collision between a first vehicle and a second vehicle, that is determined on the basis of i) first positional information of the first vehicle in which a first radio apparatus that is mounted in a first vehicle is mounted and ii) second positional information of the second vehicle that is included in a packet signal that is received from a second radio apparatus by the first radio apparatus and that at least includes the second positional information of the second vehicle in which the second radio apparatus is mounted, and a determiner that collects a plurality of provisional determination results that is acquired by the acquirer and determines collision or non-collision between the first vehicle and the second vehicle based on the collected plurality of the provisional determination results.

According to this aspect, a determination result based on a plurality of provisional determination results is obtained; therefore, a stable support for a driver can be provided.

The acquirer may include an inputter that inputs the first positional information and the second positional information of, and a provisional determiner that provisionally determines collision or non-collision between the first vehicle and the second vehicle on the basis of the positional information included in the packet signal and the first positional information and the second positional information. In this case, since the process apparatus performs provisional determination, a process in the radio apparatus can be simplified.

The determiner may change a determination result to collision when the provisional determination result has been collision N times in succession and when the determination result was previously non-collision, and change the determination result to non-collision when the provisional determination result has been non-collision M times in succession and when the determination result was previously collision. N is smaller than M in the determiner. N and M are positive integral numbers. In this case, since N is set to be smaller than M, false determination of non-collision can be suppressed.

The determiner may change a determination result to collision when a rate of collision in a plurality of provisional determination results exceeds a first threshold value and when the determination result was previously non-collision, and change a determination result to non-collision when a rate of non-collision in a plurality of provisional determination results exceeds a second threshold value and when the determination result was previously collision. The first threshold value is smaller than the second threshold value in the determiner. In this case, since the first threshold value is set to be smaller than the second threshold value, false determination of non-collision can be suppressed.

Another aspect of this disclosure relates to a process system. The process system includes a first radio apparatus that is mounted in a first vehicle, and a process apparatus that is connected to the first radio apparatus. The radio apparatus includes an acquirer that acquires first positional information of the first vehicle in which the first radio apparatus is mounted and a receiver that receives, from a second radio apparatus, a packet signal that includes at least second positional information of a second vehicle in which the second radio apparatus is mounted. The first radio apparatus or the process apparatus includes a first determiner that provisionally determines collision or non-collision between the first vehicle and the second vehicle on the basis of the first positional information that is acquired by the acquirer and the second positional information included in the packet signal that is received by the receiver. The process apparatus includes a second determiner that collects a plurality of provisional determination results from the first determiner and determines collision or non-collision between the first vehicle and the second vehicle based on the collected plurality of the provisional determination results.

According to this aspect, a determination result based on a plurality of provisional determination results is obtained; therefore, a stable support for a driver can be provided.

The second determiner may change a determination result to collision when the provisional determination result has been collision N times in succession and when the determination result was previously non-collision, and change the determination result to non-collision when the provisional determination result has been non-collision M times in succession and when the determination result was previously collision. N is smaller than M in the second determiner. N and M are positive integral numbers. In this case, since N is set to be smaller than M, false determination of non-collision can be suppressed.

The second determiner may change a determination result to collision when a rate of collision in a plurality of provisional determination results exceeds a first threshold value and when the determination result was previously non-collision and the second determiner change a determination result to non-collision when a rate of non-collision in a plurality of provisional determination results exceeds a second threshold value and when the determination result was previously collision. The first threshold value is smaller than the second threshold value in the second determiner. In this case, since the first threshold value is set to be smaller than the second threshold value, false determination of non-collision can be suppressed.

What is claimed is:

1. A radio apparatus that can be mounted in a vehicle, comprising:
    a receiver that receives, from another radio apparatus, a packet signal that includes at least second positional information of another vehicle in which the another radio apparatus is mounted; and
    a computer programmed to:
        acquire first positional information of the vehicle in which the radio apparatus is mounted;
        provisionally determine collision or non-collision between the vehicle and the another vehicle on the basis of the first positional information and the second positional information included in the packet signal, the provisional determination for the vehicle and the another vehicle being repeatedly made at a predetermined frequency;
        collect two or more provisional determination results; and
        determine collision or non-collision between the vehicle and the another vehicle based on the collected provisional determination results to generate information on the determination for a user of the radio apparatus,
    wherein the computer is further programmed to change a determination result to collision when the computer determines N times in succession that the vehicle and the another vehicle collide with each other after the computer determines that the vehicle and the another vehicle do not collide with each other,
    wherein the computer is further programmed to change the determination result to non-collision when the computer determines M times in succession that the vehicle and the another vehicle do not collide with each other after the computer determines that the vehicle and the another vehicle collide with each other, and
    wherein N is smaller than M.

2. The radio apparatus according to claim 1, wherein N and M are positive integral numbers.

3. A radio apparatus that can be mounted in a vehicle, comprising:
    a receiver that receives, from another radio apparatus, a packet signal that includes at least second positional information of another vehicle in which the another radio apparatus is mounted; and
    a computer programmed to:
        acquire first positional information of the vehicle in which the radio apparatus is mounted;
        provisionally determine collision or non-collision between the vehicle and the another vehicle on the basis of the first positional information and the second positional information included in the packet signal, the provisional determination for the vehicle and the another vehicle being repeatedly made at a predetermined frequency;
        collect two or more provisional determination results; and
        determine collision or non-collision between the vehicle and the another vehicle based on the collected provisional determination results to generate information on the determination for a user of the radio apparatus,
    wherein the computer is further programmed to change a determination result to collision when a rate of collision in a plurality of provisional determination results exceeds a first threshold value after the computer determines that the vehicle and the another vehicle do not collide with each other,
    wherein the computer is further programmed to change a determination result to non-collision when a rate of non-collision in a plurality of provisional determination results exceeds a second threshold value after the computer determines that the vehicle and the another vehicle collide with each other, and
    wherein the first threshold value is smaller than the second threshold value.

4. A process apparatus comprising a computer programmed to:
    acquire a provisional determination result regarding collision or non-collision between a first vehicle and a second vehicle, that is provisionally determined on the basis of i) first positional information of the first vehicle in which a first radio apparatus that is mounted in a first vehicle is mounted and ii) second positional information of the second vehicle that is included in a packet signal that is received from a second radio apparatus by the first radio apparatus and that at least includes the second positional information of the second vehicle in which the second radio apparatus is mounted, the provisional determination for the first vehicle and the second vehicle being repeatedly made at a predetermined frequency, and
    collect two or more provisional determination results and determine collision or non-collision between the first vehicle and the second vehicle based on the collected provisional determination results to generate information on the determination for a user of the process apparatus, wherein the computer is further programmed to change a determination result to collision when the computer collects a predetermined number of provisional determination results showing collision N times in succession after the computer determines the first vehicle and the second vehicle do not collide with each other, wherein the computer is further programmed to change the determination result to non-collision when the computer collects a plurality of provisional determination results showing non-collision M times in succession after the computer determines that the first vehicle and the second vehicle collide with each other, and wherein N is smaller than M.

5. The process apparatus according to claim 4, wherein N and M are positive integral numbers.

6. A process apparatus comprising a computer programmed to:

acquire a provisional determination result regarding collision or non-collision between a first vehicle and a second vehicle, that is provisionally determined on the basis of i) first positional information of the first vehicle in which a first radio apparatus that is mounted in a first vehicle is mounted and ii) second positional information of the second vehicle that is included in a packet signal that is received from a second radio apparatus by the first radio apparatus and that at least includes the second positional information of the second vehicle in which the second radio apparatus is mounted, the provisional determination for the first vehicle and the second vehicle being repeatedly made at a predetermined frequency, and collect two or more provisional determination results and determine collision or non-collision between the first vehicle and the second vehicle based on the collected provisional determination results to generate information on the determination for a user of the process apparatus, wherein the computer is further programmed to change a determination result to collision when a rate of collision in a predetermined number of provisional determination results exceeds a first threshold value after the computer determines the first vehicle and the second vehicle do not collide with each other, wherein the computer is further programmed to change a determination result to non-collision when a rate of non-collision in a plurality of provisional detelmination results exceeds a second threshold value after the computer determines that the first vehicle and the second vehicle collide with each other, and wherein the first threshold value is smaller than the second threshold value.

7. A process system, comprising:

a first radio apparatus, including a computer, that is mounted in a first vehicle, and a process apparatus, including another computer, that is connected to the first radio apparatus, wherein the first radio apparatus's computer is programmed to acquire first positional information of the first vehicle in which the first radio apparatus is mounted and a receiver that receives, from a second radio apparatus, a packet signal that includes at least second positional information of a second vehicle in which the second radio apparatus is mounted, wherein the first radio apparatus's computer or the process apparatus's computer is programmed to provisionally determine collision or non-collision between the first vehicle and the second vehicle on the basis of the first positional information and the second positional information included in the packet signal, the provisional determination for the first vehicle and the second vehicle being repeatedly made at a predetermined frequency, and wherein the process apparatus's computer is programmed collect two or more provisional determination results and determines collision or non-collision between the first vehicle and the second vehicle based on the collected provisional determination results to generate information on the determination for a user of the process system, wherein the process apparatus's computer is further programmed to change a determination result to collision when the first radio apparatus's computer or the process apparatus's computer determines N times in succession that the first vehicle and the second vehicle collide with each other after the process apparatus's computer determines that the first vehicle and the second vehicle do not collide with each other, wherein the process apparatus's computer is programmed to change the determination result to non-collision when the first radio apparatus's computer or the process apparatus's computer determines M times in succession that the first vehicle and the second vehicle do not collide with each other after the process apparatus's computer determines that the first vehicle and the second vehicle collide with each other, and wherein N is smaller than M.

8. The process system according to claim 7, wherein N and M are positive integral numbers.

9. A process system, comprising:

a first radio apparatus, including a computer, that is mounted in a first vehicle, and a process apparatus, including another computer, that is connected to the first radio apparatus, wherein the first radio apparatus's computer is programmed to acquire first positional information of the first vehicle in which the first radio apparatus is mounted and a receiver that receives, from a second radio apparatus, a packet signal that includes at least second positional information of a second vehicle in which the second radio apparatus is mounted, wherein the first radio apparatus's computer or the process apparatus's computer is programmed to provisionally determine collision or non-collision between the first vehicle and the second vehicle on the basis of the first positional information and the second positional information included in the packet signal, the provisional determination for the first vehicle and the second vehicle being repeatedly made at a predetermined frequency, wherein the process apparatus's computer is programmed collect two or more provisional determination results and determines collision or non-collision between the first vehicle and the second vehicle based on the collected provisional determination results to generate information on the determination for a user of the process system, wherein the process apparatus's computer is further programmed to change a determination result to collision when a rate of collision in a plurality of provisional determination results exceeds a first threshold value after the process apparatus's computer determines that the first vehicle and the second vehicle do not collide with each other, wherein the process apparatus's computer is programmed to change a determination result to non-collision when a rate of non-collision in a plurality of provisional determination results exceeds a second threshold value after the process apparatus's computer determines that the first vehicle and the second vehicle collide with each other, and wherein the first threshold value is smaller than the second threshold value.

\* \* \* \* \*